United States Patent
Sprenger

(10) Patent No.: US 8,461,515 B2
(45) Date of Patent: Jun. 11, 2013

(54) METHOD AND DEVICE FOR DETERMINING POSITIONS HAVING AT LEAST ONE SENSOR ARRAY READING TWICE AND WITH OPPOSITE READ-OUT DIRECTIONS

(75) Inventor: Bernhard Sprenger, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 348 days.

(21) Appl. No.: 13/058,190

(22) PCT Filed: Aug. 28, 2009

(86) PCT No.: PCT/EP2009/061127
§ 371 (c)(1),
(2), (4) Date: Feb. 25, 2011

(87) PCT Pub. No.: WO2010/028963
PCT Pub. Date: Mar. 18, 2010

(65) Prior Publication Data
US 2011/0139873 A1    Jun. 16, 2011

(30) Foreign Application Priority Data
Sep. 12, 2008 (EP) .................................. 08164285

(51) Int. Cl.
*G01D 5/34* (2006.01)
(52) U.S. Cl.
USPC ................................. 250/231.13; 250/214 R
(58) Field of Classification Search
USPC .............. 250/231.13, 231.16, 214 R; 341/11, 341/13
See application file for complete search history.

(56) References Cited

U.S. PATENT DOCUMENTS

| | | | |
|---|---|---|---|
| 4,384,204 A * | 5/1983 | Tamaki et al. | ............ 250/237 G |
| 4,668,862 A | 5/1987 | Waibel | |
| 4,831,376 A | 5/1989 | Reid et al. | |
| 6,483,104 B1 | 11/2002 | Benz et al. | |
| 7,291,831 B2 | 11/2007 | Rajaiah et al. | |

FOREIGN PATENT DOCUMENTS

| | | |
|---|---|---|
| DE | 34 45 617 | 7/1985 |
| DE | 35 28 955 | 4/1986 |
| DE | 199 07 326 | 8/2000 |
| DE | 199 39 643 | 3/2001 |
| EP | 0 325 924 | 8/1989 |
| EP | 1 632 754 | 3/2006 |
| GB | 2 323 459 | 9/1998 |

* cited by examiner

*Primary Examiner* — Que T Le
(74) *Attorney, Agent, or Firm* — Maschoff Brennan

(57) ABSTRACT

To determine the positions of a code on a movable support, said support can be moved in a displacement direction relative to a sensor element comprising at least one sensor array in the vicinity of said array. The sensor array or arrays determine(s) the position of imaged code elements that can be differentiated from radiation in the vicinity of the sensor elements, the recorded values being read out in at least one read-out direction and positional values being determined from said values. The array or arrays is or are read out twice from opposite read-out directions, or one sensor pair consisting of two sensor arrays, is read out as a pair from opposite directions. Positional values are derived from the positions of the differentiated code elements and said values are averaged to provide a position with an improved accuracy. The accuracy can thus be increased by simple means.

24 Claims, 11 Drawing Sheets

METHOD AND DEVICE FOR DETERMINING POSITIONS HAVING AT LEAST ONE SENSOR ARRAY READING TWICE AND WITH OPPOSITE READ-OUT DIRECTIONS

The invention relates to a method for determining positions of a code-carrying carrier movable in relative fashion, a corresponding device, and two sensor elements for carrying out the method.

BACKGROUND

For determining relative positions between two elements, a carrier having at least one barcode track and at least one sensor arrangement for detecting code information, e.g. barcodes, are used in many fields of application. The detected barcode information makes it possible to determine the sensor position relative to the code or to the code carrier, wherein, in principle, both the code carrier and the sensor can be configured as the movable unit relative to the rest of the components. When linear positions are determined, linearly running codes or graduations and sensor arrays partly overlapping the latter are used. An angular position can be detected with a circular graduation and a sensor array, in particular a CMOS array, extending over a section of the circular graduation.

Different graduations are used depending on the field of application, functional principle and accuracies to be realised. By way of example, a circular graduation can be divided into intervals encoded in an absolute fashion, wherein the sensor array reads the interval number and derives a coarse angle determination therefrom. In order to obtain an exact angle value, the position of an interval mark relative to the sensor array is determined from the intensity values of the sensor array.

The documents EP 0 085 951 B1, U.S. Pat. No. 4,668,862 A1 and DE 199 39 643 describe different solutions for position determination. In accordance with EP 0 085 951 B1, the centroid of the interval mark is determined. U.S. Pat. No. 4,668,862 A1 additionally describes the determination of a line pattern characterizing the respective interval. In DE 199 39 643 A1 the position of the interval mark is determined by means of the flank positions of many graduation lines being detected and a single fine value being determined therefrom.

DE 35 28 955 A1 discloses an angle measurement for geodetic instruments, wherein a rotatable pitch circle comprises both a graduation encoded in an absolute fashion and an incremental graduation. The angle magnitude is determined from the two graduations being read by means of two fixed sensor systems diametrically opposite one another and by means of two rotatable sensor systems diametrically opposite one another. The outlay for the two reading processes is high and reading errors can nevertheless occur.

If the center of the circular graduation does not lie precisely in the center of the rotation axis, then eccentricity errors occur, which can be corrected for example in accordance with various exemplary embodiments in EP 1 632 754 A1. This solution is only directed to the eccentricity and cannot minimize other errors.

EP 325 924 A1 and DE 199 07 326 A1 describe a determination of the angular position using four scanning sensors, wherein eccentricity errors are reduced by the signal evaluation of the four scanning sensors.

The quality of a position determination can also depend on the transmission of the signals determined by the scanning sensors. DE 34 45 617 A1 describes a serial transmission of measurement value data with transmission rates of 1.5 to 2.0 MHz. Precisely with high transmission rates, errors can also occur depending on the sensor arrays used.

Since the measurement accuracy is also dependent on the light intensity, U.S. Pat. No. 7,291,831 B2 and U.S. Pat. No. 7,291,831 B2 describe solutions wherein the brightness of the light source is adapted in accordance with an intensity measurement. U.S. Pat. No. 6,483,104 B1 describes the use of pulsed light in order to overcome problems with short scan times and weak light. Complex light sources and controllers have to be used for high light intensities at high pulse rates.

SUMMARY

The object, then, is to find an improved solution which makes it possible to avoid as many errors as possible when determining linear positions or angular positions with codes or graduations.

A further object is to enable increased read-out speeds in generic linear or angular encoders, in particular using a simple construction.

In many generic applications, an exact reading of the code is effected not just in the motionless state but in a state in which the code carrier and hence the graduation rotates or is displaced linearly relative to the detector. In the moved state—that is to say when the carrier with the code is moved in a movement direction relative to the sensor arrays—a fast measurement has to be able to be carried out. Accordingly, a sensor array extending at least over part of a code or of a graduation has to detect the imaging of a code excerpt onto the sensor array very rapidly. The processing of the detected values and the determination of position information are also intended to be carried out as rapidly as possible. High relative speeds thus usually necessitate correspondingly adapted read-out speeds, that is to say high clock rates of the detector.

Distinguishable code elements, during the imaging onto the elements of the sensor array, lead to intensity distributions which are often read out serially in a read-out direction. The read-out direction comprises a sufficiently large component along the movement direction of the carrier with the code. In the case of linear position sensors, the movement direction of the carrier is a linear direction along which a forward or backward movement is possible. In the case of arrangements comprising a carrier which rotates about a pivot point and on which the code extends in the circumferential direction, the movement direction is the circumferential direction, counter-clockwise and clockwise rotation being possible.

Angular and linear encoders in accordance with the prior art use one, two or more sensors having a multiplicity of pixels. Thus, e.g. in angular encoders, typically two line sensors are arranged at angular distances of 180° or four line sensors are arranged at angular distances of 90°.

The invention is based on the insight that, at high read-out frequencies or read-out speeds, errors can predominant which are dependent on different influencing variables nonlinearities and nonidealities of the sensor elements, of the signal output stages and signal gain depending on the read-out frequency, the intensity of the radiation used or of the light used, and/or temperature-dependent drift effects. It has likewise been recognized that it is not necessary, however, to reduce all these disturbing influences by means of specific measures or to use components which are designed for corresponding speeds or frequencies. According to the invention, therefore, read-out speeds beyond the actual operating parameters can also be realized even with less costly or less complex arrangements.

The read-out speed is proportional to the number of pixels read per unit time and thus corresponds to the read-out frequency. Since each pixel has a fixed pixel extent, the read-out speed can be understood as the sensor extent which is read per unit time in the read-out direction and which corresponds, apart from the factor of the pixel extent, to the number of pixels read per unit time. The read-out frequency is also mentioned at this point since it is understood to mean the number of read-out operations per unit time.

The output stage of the sensor arrays used for position determinations has output characteristics which are comparable with those of MOSFET transistors and therefore have linear and saturated ranges that are dependent on the operating voltage.

The sensor arrays detect the bright-dark pattern of that part of a code which is imaged onto the sensor array preferably in the form of peaks which represent pixel values which rise from a basic value to a maximum and then fall again in the read-out direction. The sensor arrays exhibit low-pass filter characteristics and/or nonlinearities which lead to a deformation of the peaks determined, wherein the deformation in the form of angular peaks with a displaced centroid is dependent on the read-out clock frequency. It has been recognized that the positions of the peaks determined from the detected intensity distributions are displaced in the read-out direction, wherein the displacement is dependent on the orientation of the read-out direction relative to the movement direction of the carrier with the code.

If the read-out direction of a sensor has an identical characteristic or direction with regard to the movement direction, or with respect to a component of the movement direction, then a displacement in a first direction occurs. If the read-out direction of a sensor is directed oppositely to the rotation or movement direction of the code carrier, or with respect to a component of the movement direction, then a displacement in a second, opposite direction occurs. The displacement is therefore dependent on the orientation of the read-out direction relative to the movement direction. Since this effect already occurs at a read-out clock frequency of 1 MHz in the case of commercially available components, artefacts occur at higher read-out speeds, e.g. if the pixels are read at frequencies of up to 12.5 MHz. Thus, e.g. the sensor image is distorted or displaced in the direction of the sensor read-out direction.

If linear or angle positions are determined proceeding from the distorted or displaced peaks, then this leads to position values which are displaced somewhat with respect to the real values. The position displacement is dependent not only on the relative direction between read-out direction and movement direction but also, for example, on the read-out frequency, at least one threshold value used in the evaluation of the peaks, and/or the intensity of the radiation source or light source which can be used in the case of the sensor array.

It has additionally been recognized that the type of the arrangement of the sensors or the read-out direction thereof affects the possible errors. If the sensors are switched in the same direction with regard to their read-out direction relative to the movement direction of the code or of the carrier thereof, which is the case in the known solutions, then, during the reading of the pixels, asymmetrical peaks of radiation sections passing through the graduation already occur starting from an average read-out frequency and primarily above the frequency actually provided—on account of nonlinear effects as a result of saturation and/or bandwidth limitations. In this case, the peaks generated by the code on the sensor arrays are not only altered in the flanks but also flattened on account of the saturation effects and nonlinearities, which leads to a centroid displacement in the read-out direction.

If the sensor arrays used for the position determination all have the same sensor read-out direction relative to the movement direction of the code, the position value determined from the positions of the peaks of different sensor arrays will also be offset somewhat in the read-out direction. In this case, the error is dependent on the read-out frequency, the evaluation with a threshold value, the light intensity, and can additionally be amplified by temperature-dependent drift effects.

If, then, one sensor is read twice with different directions or two sensors are read in opposite directions in a pairwise manner, then it is possible to compensate for displacements that are identical in opposite directions.

In this case, it is also possible for a plurality of linear arrays to be arranged as respectively linear sequences of pixels and read in such a way as to result in an opposite read-out direction at least in part. It is advantageous in this case to form said linear arrays on a common chip and connect them in series in such a way that a common read-out operation is possible, which reads the pixels of the linear arrangements in an alternating direction. Such sensor arrangements can be formed with two, three, four or more linear arrays, wherein the latter can be arranged in a manner lying alongside one another, that is to say with parallel orientation of their longitudinal axes, for example for detecting one and the same section of the code. However, an arrangement of the linear arrays in a line is also possible, that is to say with a common longitudinal axis. In this case, however, depending on the type of displacement and code used, it is also possible, in principle, to combine the two arrangements with one another and to use a matrix-like arrangement of the linear arrays.

The realization according to the invention of a non-erroneous state additionally permits the comparison with an erroneous state, such that conclusions about the errors that occur or the behavior thereof, e.g. with dependence on time or temperature, can be drawn therefrom. This means that with the comparison of sensor pairs read in the same direction and in opposite directions, it is possible to determine errors depending on at least one parameter such as, for example, the read-out frequency, the radiation intensity or light intensity and/or the temperature. When determining an averaged position from the positions of at least one sensor pair read in opposite directions, the error substantially disappears. If, then, the at least one sensor pair is also read in the same direction and the values determined are averaged to form a position value, the error on account of the parameter values currently present results from the difference between the two average values. In the case of one sensor pair, a changeover device can make it possible to change between read-out in the same direction and read-out in opposite directions. In order to enable corresponding comparisons, it can be ensured that the effective position has not changed between the two measurements.

In this case, CMOS arrays have the advantage that they can even be read nondestructively, that is to say that the same image can be read from both sides, such that both items of information can be obtained.

If error values are then determined for different parameter values, such as e.g. the read-out frequency or the light intensity or the temperature, in each case in accordance with the procedure just described, error profiles can be detected depending on the corresponding parameter. If appropriate, if it is necessary to dispense with sensors read in opposite directions, an error correction in accordance with the current parameters can also be provided in the case of just one sensor or in the case of sensors read in the same direction. This error correction can be used for the purpose of a more exact calibration for different read-out frequencies and/or for different radiation or light intensities and/or for different temperatures.

When deriving positions proceeding from the positions of the peaks detected by means of the sensor arrays, it is possible to carry out a correction dependent on the intensity of the radiation or light intensity arriving at the sensor arrays. By way of example, an intensity-dependent position difference is added to the position derived from the peaks. However, the information concerning the current maximum intensity at the sensors can also be used for detecting possible contaminants in the path from the radiation or light source to the sensor arrays. If the contamination is too great, necessary cleaning can be indicated.

The sensor arrays are preferably diode arrays or CMOS arrays. It goes without saying that all areal and linear sensor arrangements with a read-out in one read-out direction can be used. The sensors are preferably line arrays that detect the positions of lines of the code. If appropriate, however, it is also possible to use two-dimensional sensor arrays.

BRIEF DESCRIPTION OF THE FIGURES

The drawings elucidate the invention on the basis of illustrations concerning the prior art and concerning an exemplary embodiment. In this case, in schematic illustration.

DETAILED DESCRIPTION

Figure 1:
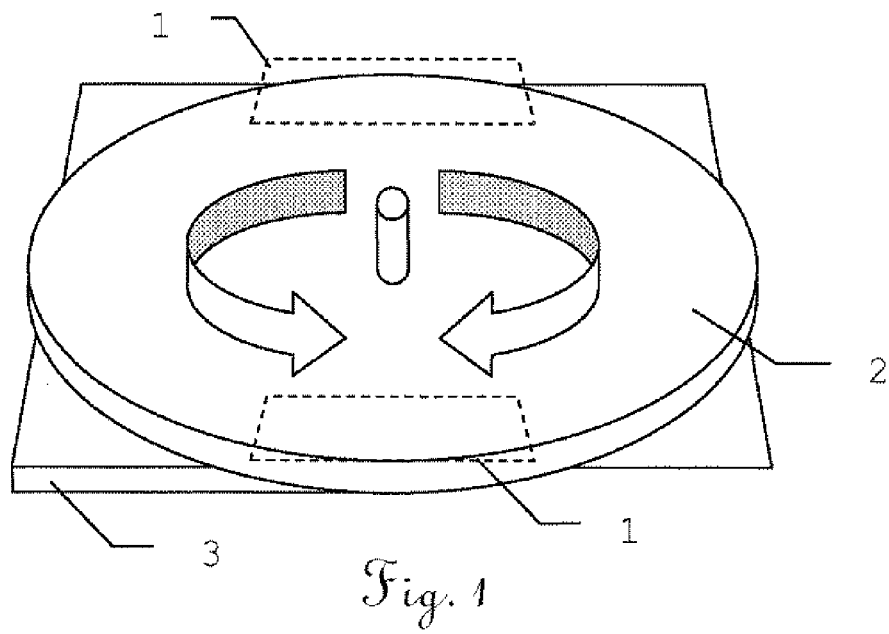
FIG. 1 shows an angle encoder with a sensor pair composed of two opposite sensor arrays.

FIG. 1 shows the schematic illustration of the structural construction of a generic angle measuring device or angle encoder comprising a sensor pair composed of two opposite sensor arrays 1 and a rotary body 2 with a multiplicity of pattern elements arranged around a pattern center. The disk-shaped rotary body 2 is arranged such that it is rotatable about an axis relative to the carrier element 3 with the sensor arrays 1 connected thereto. The direction of rotation of the rotary body 2 defines a movement direction relative to both sensor arrays 1. Code elements are imaged onto the at least two sensor arrays 1 in a distinguishable manner by radiation, such that it is possible to determine the position of said code elements in the region of the sensor arrays 1. In order to determine a current rotational position of the rotary body 2 relative to the carrier element or to the sensor arrays 1, therefore, at least a portion of the pattern elements is imaged onto the sensor arrays 1 of the sensor pair. In this case, the positions of the imaged pattern elements are resolved and the rotational position is derived. Depending on the number of sensors used, various periodic error influences, such as e.g. eccentricity errors or periodic graduation errors, can be eliminated by averaging in this case.

For each sensor array 1, the values representing a position of the code elements are read out in an array-specific read-out direction and the relative position of rotary body 2 and sensor arrays 1 or carrier element 3 is derived from these values after averaging. Another approach according to the invention consists in reading a sensor array 1 of a sensor element for recording the same pattern elements, that is to say in the same positioning of code carrier and sensor array, twice with different read-out directions. The values for the two read-out operations can then likewise be averaged.

Figure 9:
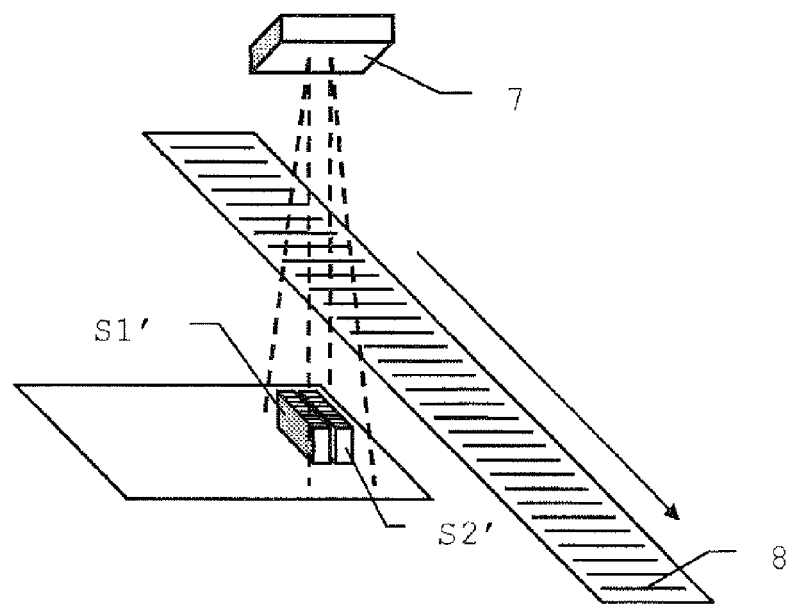
FIG. 9 shows a linear encoder according to the invention comprising two sensor arrays, onto which the same code elements are imaged.

In this case, the term averaging also encompasses, besides simple average formation, more complex aggregates, e.g. by the values of the sensor arrays 1 being provided with weight functions, which, by way of example, can also be variable in a time- or temperature-dependent manner. Thus, it is also possible to take account of drift effects of the sensors, in particular in connection with the error analysis that is likewise possible according to the invention. No radiation sources or illumination devices are illustrated in FIG. 1 for reasons of clarity. However, these arrangements are generic realizations and known to the person skilled in the art; moreover, these can also be realized in a manner analogous to the example of a linear encoder as illustrated in FIG. 9.

Figure 2:
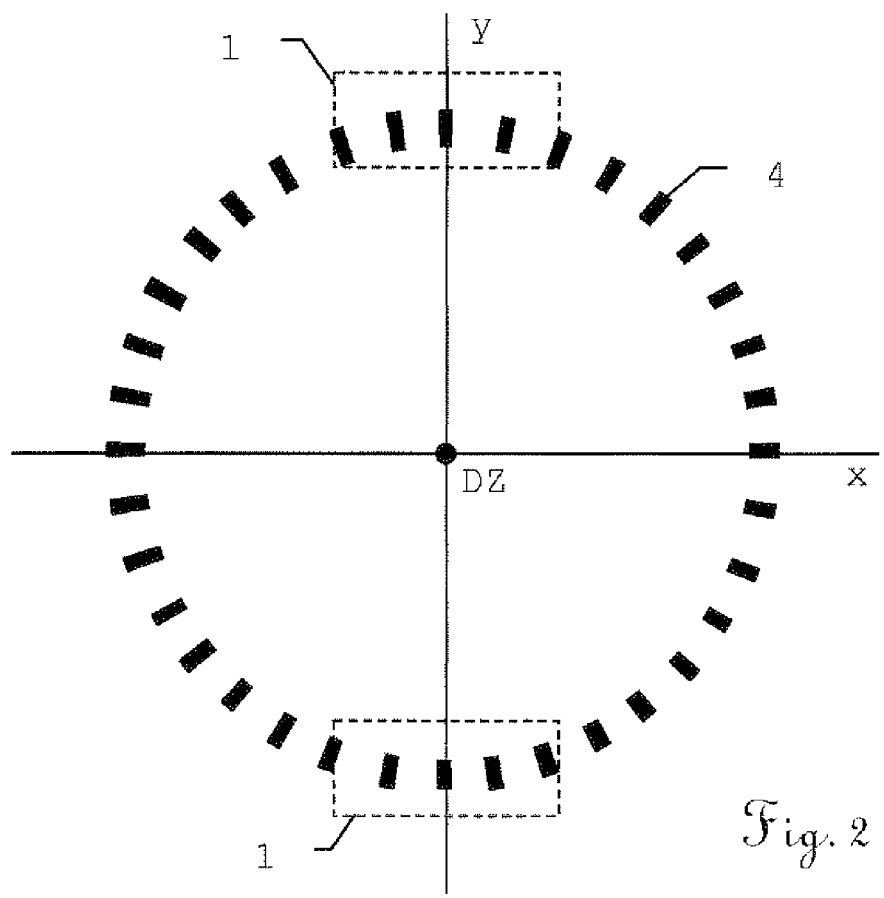
FIG. 2 shows a code for the angle encoder from FIG. 1 and its imaging onto the sensor pair.

FIG. 2 schematically illustrates a code for the angle encoder from FIG. 1 and its imaging onto the sensor pair. The illustration shows the pattern elements 4, the pattern center of which in this case coincides with the rotation axis. For the arrangement with the sensor pair composed of opposite sensor arrays 1, it is possible to define a center DZ, which is ideally intended to correspond to the pattern center and the rotation axis, such that no eccentricity errors occur. With regard to the detector arrangement, moreover, it is possible to define an x- and a y-axis as reference variables with regard to which the rotational positions are determined. In the examples, the code arranged on the rotary body is illustrated as an incremental code with an equidistant sequence of pattern elements 4 of identical type, merely for reasons of clarity. However, the method according to the invention is not restricted thereto and can be used, in principle, for all types of incremental or absolute codes.

Figure 3A:
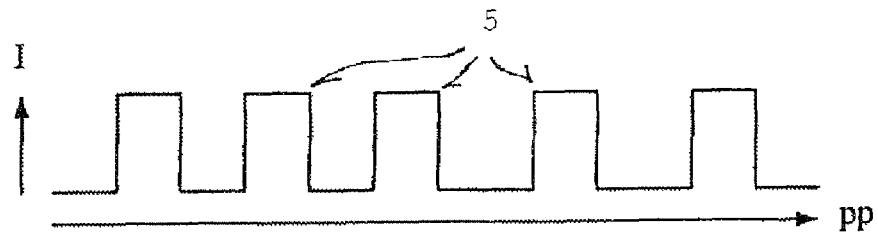
FIG. 3a shows effective peaks that would be detected by an ideal sensor array without errors, where the axis I designates the intensity and the axis pp designates the pixel position.

In accordance with FIG. 3a, as a result of the imaging or projection of the code elements on the sensor arrays, rectangular peaks 5 are generated and used ideally for determining a precise position, the position of said rectangular peaks corresponding to the effective position of code elements, in particular of a graduation or of a barcode, relative to the respective sensor array. The measured rectangular peak 5 as a signal waveform is then characterized at least by a position value and, if appropriate, by a width. For instance, the center of the rectangular peak 5 is suitable as the position.

Figure 3B:
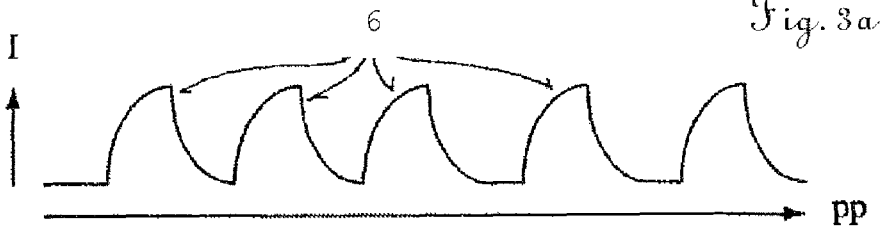
FIG. 3b shows peaks read by a sensor array at a high read-out speed with errors, where the axis I designates the intensity and the axis pp designates the pixel position.

In accordance with FIG. 3b, the peaks 6 effectively read by a sensor array can be beset with errors. The errors are dependent on the read-out speed and also the read-out direction and lead to deformed peaks 6. Depending on the parameters, such as e.g. intensity and read-out speed, the ideal rectangular signal is deformed, in which case the position of the crest value can also be displaced alongside the edge deformation as a result of saturation effects, thus resulting in asymmetrical peaks 6 having centroids displaced in the read-out direction. The position of a peak 6 or of the centroid thereof, can be determined, for example, by setting all pixel values below a threshold value to zero and all pixel values above the threshold value to one.

The displacement of a rectangular peak 5 derived from an asymmetrical peak 6 relative to the expected rectangular peak 5 is dependent on the asymmetry and on the threshold value used.

It has been found that together with the read-out speed and read-out direction, other parameters such as, for example, the radiation intensity, in particular light intensity, and the temperature also have an influence on the displacement of the determined centroid of a peak, in which case an isolated quantification and elimination of these error influences would mean a high outlay.

Figure 4:
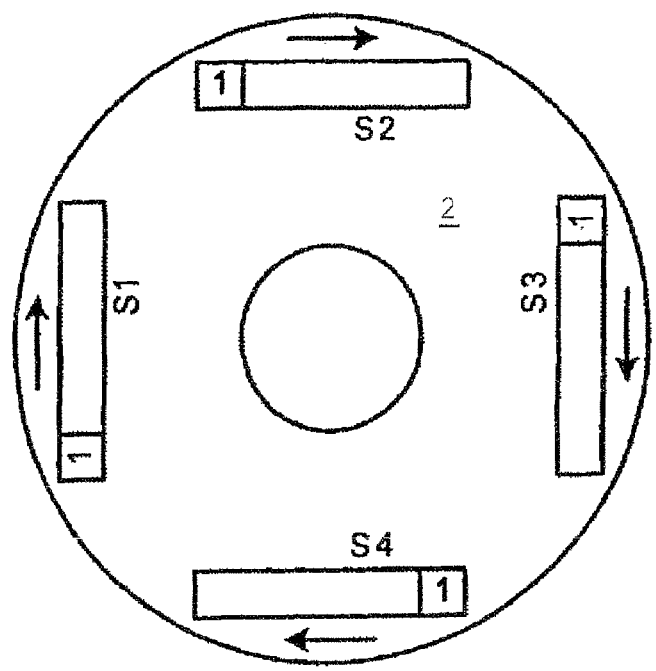
FIG. 4 shows an arrangement in accordance with the prior art comprising a carrier with circular graduation and four sensor arrays arranged in the same direction.
Figure 6:
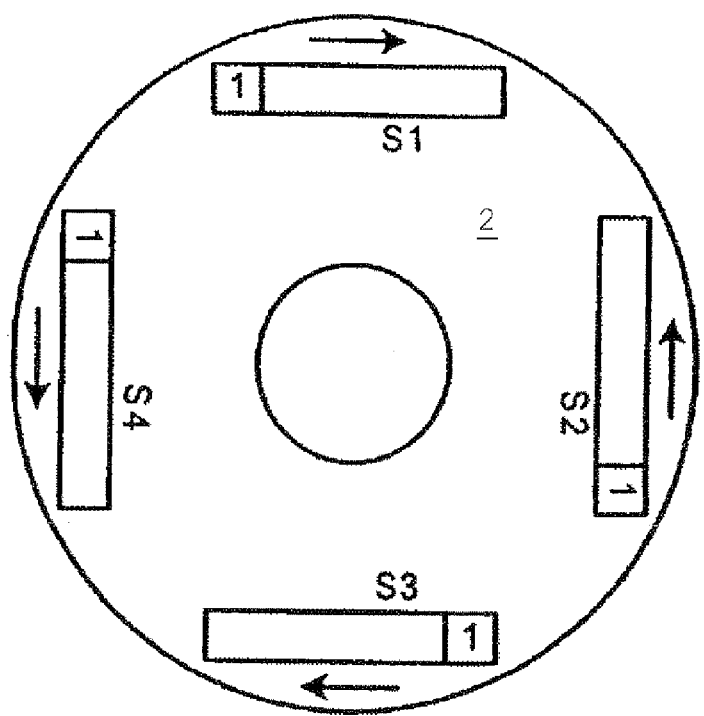
FIG. 6 shows a plan view of a carrier with a circular graduation and a first embodiment of four sensor arrays arranged in opposite directions in a pairwise manner.
Figure 8:
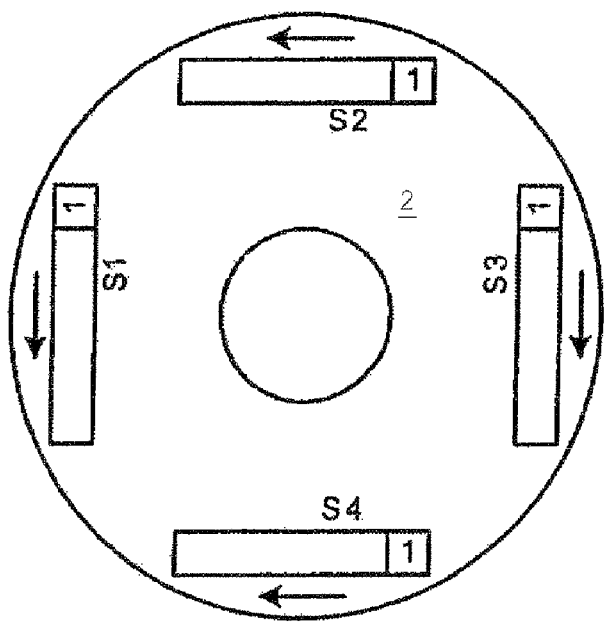
FIG. 8 shows a plan view of a carrier with a circular graduation and a second embodiment of four sensor arrays arranged in opposite directions in a pairwise manner.

FIGS. 4, 6 and 8 show a typical sensor configuration for angle encoders, wherein eccentricity errors, for example, can be determined by the sensor arrays S1, S2, S3, S4 used and the arrangement thereof. In accordance with FIGS. 4, 6 and 8, at least two sensor arrays, but preferably four sensor arrays S1, S2, S3 and S4, are assigned to sections of barcodes or circular graduations. In the present embodiment, the coding is arranged as circular graduation on a carrier disk as rotary body 2. The carrier disk is rotatable about its center relative to the sensor arrays S1, S2, S3 and S4. The coding is arranged (but not illustrated) in the radial region in the case of the sensor arrays S1, S2, S3 and S4. The circumferential movement of the rotating rotary body 2 ensures, relative to the sensor arrays S1, S2, S3 and S4 a movement direction of the code substantially in the longitudinal direction of the sensor arrays S1, S2, S3 and S4.

The position determination can be effected by means of any desired coding, that is to say any pattern, an absolute code and/or an incremental code. It goes without saying that a linearly running coding on a linear carrier is used in the case of linear systems.

Figure 5:
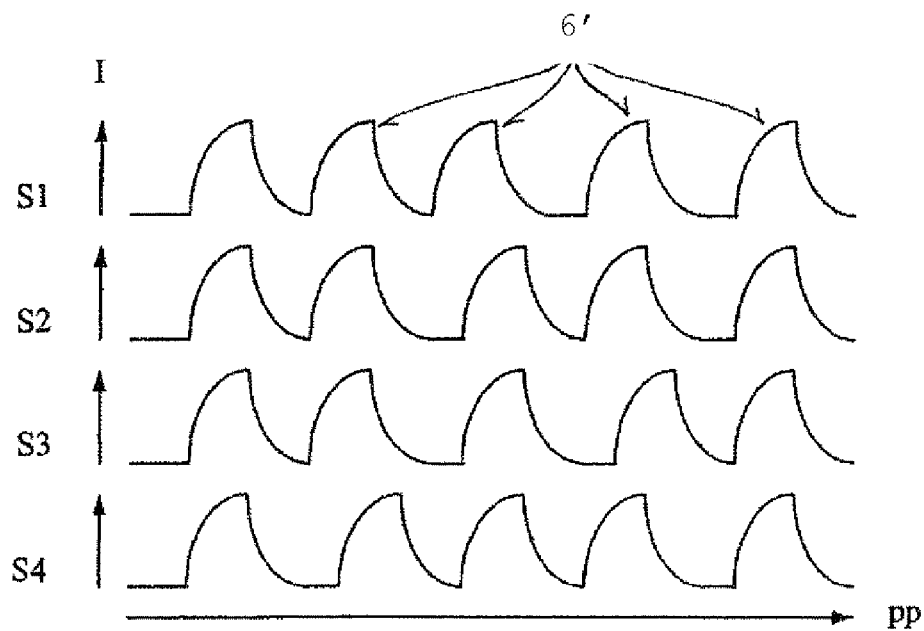
FIG. 5 shows the peaks read by the four sensor arrays from FIG. 2 at a high read-out speed, where the axis I designates the intensity and the axis pp designates the pixel position.
Figure 7:
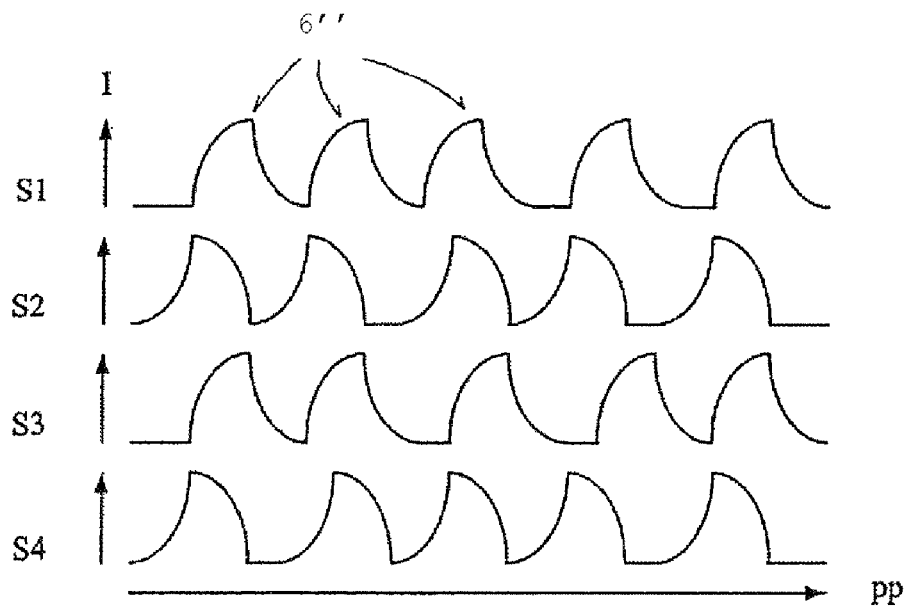
FIG. 7 shows the peaks read by the four sensor arrays from FIG. 4 with errors, where the axis I designates the intensity and the axis pp designates the pixel position.

In accordance with FIGS. 5 and 7, each sensor array S1, S2, S3 and S4 in FIGS. 4 and 6, respectively, yields at each point in time an intensity profile which, in each case proceeding from a first pixel, here illustrated by the number "1", is detected in the read-out direction. In this case, FIGS. 5 and 7 show the signal profile with distortions such as occurs for high read-out frequencies, for example. If the sensor arrays S1, S2, S3 and S4 are read with lower frequencies, then the signal profile approaches the ideal rectangular profile.

In FIG. 4, along the circumferential direction, all sensor elements having sensor arrays S1, S2, S3 and S4 are oriented or switched in the same direction in terms of their read-out direction in a first embodiment, that is to say that they are read in the same direction in the direction of rotation, as is realized in the prior art. This means that the pixels are read from the first pixel uniformly in the same or opposite direction relative to that in which the rotary body 2 also moves. In FIG. 6 and FIG. 8, this uniform orientation is canceled and the read-out directions are interlaced relative to one another, that is to say that at least one of the sensor arrays 1 is read counter to the read-out direction of the remaining sensor arrays 1 with regard to the as a result of the movement direction. In particular, sensor pairs can respectively be read in opposite directions, such that a pairwise compensation ensues in the case of even-numbered arrangements. In this case, it should be taken into account that the read-out direction considered without reference to the movement of the rotary body 2 can indeed be in the opposite direction, whereas the read-out direction is defined in the same direction with reference to the movement of the rotary body. This is evident in FIG. 4, for example, in which the sensor arrays S2 and S4, without reference to a rotation, should be considered as read in opposite directions. However, if the position of the rotary body 2 that is to be measured is taken into account and therefore refers to the rotation defining a movement direction, then the read-out is actually effected in the same direction.

In FIG. 6, two pairs composed of the sensor arrays S1 and S2, and S3 and S4, are respectively arranged in opposite directions with their read-out direction in the movement direction. The adjacent and mutually angled sensor pairs composed of the sensor arrays S1 and S2, S3 and S4 are thus read in opposite directions in a pairwise manner beginning from the first pixel in the circumferential direction, i.e. rotation direction.

Position values of the code relative to the corresponding sensor array are determined from the read peaks 6' and 6", or the centroids of the read peaks 6' and 6", illustrated in FIGS. 5 and 7, respectively. When determining a precise position, a position value can firstly be determined for the read peaks 6' of each sensor array, which position values are then averaged to form a precise position, or else averaging is effected at the level of the values not resolved with regard to the position, such that the position determination can be carried out proceeding from the peak positions of the sensor arrays even without determination of position values for individual sensor arrays by direct aggregation of the values.

In accordance with FIG. 6, the sensor arrays S1, S2, S3 and S4 are switched in opposite directions in a pairwise manner with regard to their read-out direction relative to the movement direction of the code, in particular a circumferential direction of the circular graduation, or are read in this direction. In this case, FIG. 7 shows the displacements—occurring when the pixels are read—of the peak centroids of radiation or light sections passing through the graduation in the case of the sensor arrays S1, S2, S3, S4 read in opposite directions in each case in opposite directions of the axis pp. In accordance with the displacement of the peaks 6", the position value derived from the peaks 6" of a sensor array S1, S2, S3, S4 is also displaced somewhat. Upon the averaging of derived positions over pairs of sensor arrays S1, S2, S3, S4 read in opposite directions, the asymmetries of the peaks 6" and thus the opposite displacement errors of the individual sensor arrays S1, S2, S3, S4 substantially cancel one another out. Such an arrangement eliminates both lateral x/y drifts lying in the sensor plane and angle drifts, that is to say drift-dictated alterations in the measured rotational position.

Comparison of FIGS. 5 and 7 makes it clear that the identically oriented peak displacements all exhibit substantially the same displacement. In the case of the alternately different orientations of the peaks 6" in FIG. 7, the errors cancel one another out in a pairwise manner. The simple possibility for correcting position values is clearly evident from this.

If the sensor arrays are then read with different pairings or read-out arrangements, it is possible to analyse the erroneous state in one instance and the error-compensated state in another instance and, from a difference consideration, to draw conclusions about the system behavior or the behavior of the components, e.g. the thermal drift behavior thereof. This can be realized, for example, by means of switchable read-out directions or else double the number of sensor arrays having a fixed read-out direction, only the sensor array with the respectively desired read-out direction then ever being used in the latter case. The arrangement shown in FIG. 6 would then have a total of four double sensor arrays or eight sensor arrays which are switched in opposite directions respectively in pairs and can be read selectively. If the signals generated by the realization of the read-out states in accordance with FIG. 4, on the one hand, and FIG. 6, on the other hand are recorded, then this results in the intensity distributions in accordance with FIG. 5 and in accordance with FIG. 7. These differ somewhat from one another in terms of the values representing the positions, or the positions determined. In this case, the difference corresponds to an error that can be assigned to the current parameters (read-out speed, light intensity, temperature). If, then, by way of example, only one parameter value is adjusted in steps and the associated error is determined, these errors can also be used for calibration purposes. This can be realized, in particular, when the sensor arrays can be grouped differently or read in a random fashion. In this case, by means of selective switching of individual or a plurality of arrays in the opposite direction with respect to the read-out direction of the others, if appropriate in association with locally varied intensities or other parameters, a wide variety of relations can be generated which also make it possible to determine the system using more complex methods, e.g. by means of statistical estimation methods, for example maximum likelihood estimators. The variation of the read-out direction thus permits the generation of a number of defined measurement states by changeover of the read-out direction of individual or a plurality of arrays or the pairwise grouping thereof. In this case, the solution according to the invention is not restricted to angle encoders or those comprising four sensors. According to the invention, it is also possible to realize measuring devices having other even numbers of sensors, e.g. having six or eight detectors. Moreover, with corresponding calibration or weighting, it is possible to use odd-numbered arrangements, e.g. if, in the case of three detectors, the contribution of one detector switched in an opposite direction is doubly taken into account or correspondingly amplified. Consequently, for example, arrangements comprising three, five or seven detectors can also be evaluated according to the invention.

FIG. 8 shows an alternative to the read-out relation realized in FIG. 6 with a second embodiment according to the invention of four sensor arrays S1, S2, S3 and S4 arranged in opposite directions in a pairwise manner. In this case, the respectively opposite sensor arrays S1 and S3, and S2 and S4, are switched in opposite directions as sensor pairs in the movement direction. In this case, too, the relation arises that two of the four sensor arrays S1, S2, S3, S4 are read in the movement direction and two are read in the opposite direction with respect to the movement direction, wherein the compensation effect corresponding to FIG. 6 results in the signal evaluation. This arrangement—in a manner similar to that in the case of the arrangement in FIG. 6—eliminates the angle drift, but, in contrast to said arrangement in FIG. 6, does not eliminate x/y drifts.

FIG. 9 shows a schematic illustration of a linear encoder according to the invention comprising two sensor arrays S1' and S2' of a sensor element, onto which the same code elements of a linear code carrier 8 are imaged. Besides the use in flat geometries, e.g. when measuring a linear displacement, this construction can also be used in the measurement of rotational positions of cylindrical bodies or cylindrical graduations. A radiation or light source generates a projection of the code elements on the two sensor arrays S1' and S2', wherein said sensor arrays S1' and S2' form a sensor pair which is read in opposite directions in the movement direction of the linear code carrier 8. Thus, the solution according to the invention can also be applied to linear systems, wherein, in the example shown, the same location of the code is imaged onto two detectors, but a read-out in opposite directions is effected. In this case, this arrangement with the detection of the same code elements by two sensor arrays can also be realized for the arrangements shown in FIGS. 6 and 8. Naturally, embodiments according to the invention with imaging of different code locations onto two successively arranged sensor arrays or with two-dimensional displacements and corresponding code systems for linear encoders can likewise also be realized. This principle can likewise also be realized with just one sensor array, the values of which are read, with the information embodied by the imaging being obtained, successively or simultaneously in two different directions. Instead of the sensor pair composed of the two sensor arrays S1' and S2' each having a specific orientation and read-out direction, a sensor array having two opposite read-out directions is therefore used in this case. As in the other exemplary embodiments, too, fundamentally a combination of both principles can also be used here, that is to say that both sensor pairs having opposite read-out directions and individual sensor arrays having two read-out directions can be combined in a common arrangement.

Figure 10:
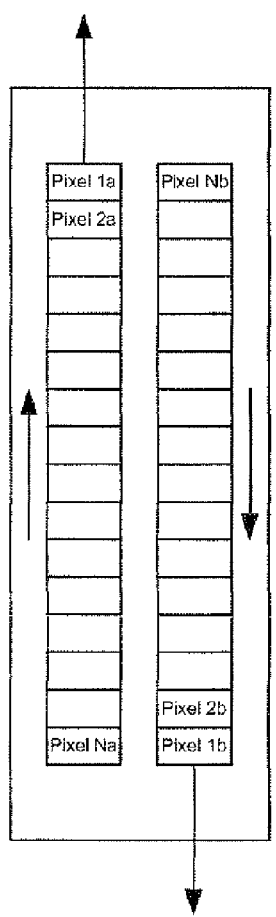
FIG. 10 shows a first exemplary embodiment of a sensor element according to the invention comprising two sensor arrays arranged in opposite directions for the rotary encoder from FIGS. 1, 4, 6, 8 and the linear encoder from FIG. 9.

FIG. 10 shows the two sensor arrays with a parallel arrangement for the linear encoder from FIG. 9, wherein these sensor arrays are arranged as a first exemplary embodiment of a sensor element according to the invention on a common carrier chip, which can also be realized for the exemplary embodiment in FIG. 6 and in FIG. 8, if two sensor arrays are combined in one sensor element. The two sensor arrays are embodied as linear arrays having a sequence of n pixels 1a-Na and 1b-Nb, respectively, wherein a linear array constitutes a successive stringing of pixels, which does not necessarily have to be effected in a straight form. Rather, it is also possible to use sequences of pixels on a curved line as a linear array, as long as they can be read serially. The term linear array here therefore also encompasses circle segments or sequences of pixels arranged in a circle-like manner. In this example, the two linear arrays each have dedicated data lines as signal outputs for the read-out of the pixels. In this case, the data lines are respectively arranged at the opposite ends of the two linear arrays, such that the latter are read in parallel, but in opposite directions. In this case, the distance between the two linear arrays is chosen such that the same code elements are in each case detected by pixels of the two linear arrays. The two linear arrays can be arranged close together, that is to say at just a small distance, such that the code to be detected jointly is projected onto the two linear arrays as identically as possible. Thus, the distance can be kept, for example, smaller than the width of the linear arrays or at least in the range of the width thereof or double or treble the width. The two signal outputs permit high read-out speeds, but at the same time also increase the complexity since two signal processings have to be ensured.

Alternatively, according to the invention, rows or columns of an area sensor or of a matrix-like arrangement of pixels can also be read in opposite directions in analogous manner.

Figure 11:
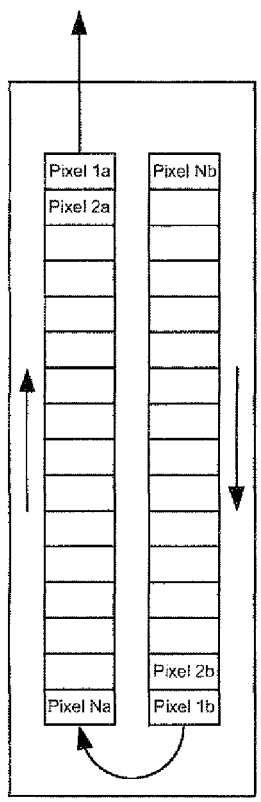
FIG. 11 shows a second exemplary embodiment of a sensor element according to the invention with a parallel arrangement of the sensor arrays.

A second exemplary embodiment of a sensor element according to the invention with parallel arrangement of the sensor arrays and joint serial read-out is illustrated in FIG. 11. In this exemplary embodiment, the two sensor arrays are likewise advantageously arranged on a common carrier chip, in which case they are connected in series in such a way that they are read with opposite read-out directions in a common read-out operation as a single sensor array. In this case, the two sensor arrays, as also in the arrangement in accordance with FIG. 10, are oriented with their longitudinal axes parallel to one another. This arrangement thus corresponds to a sensor array separated into two partial regions, wherein the partial regions are connected in series. As a result of the common read-out operation with only one signal output or only one data line, although the read-out speed is reduced by comparison with the arrangement from FIG. 10, the evaluation can be effected with only one common signal processing, such that a lower outlay is required. Moreover, errors or influences effect both rows in a common manner. It is thus possible to compensate, in particular, for drift effects or brightness dependencies or local fluctuations on account of the common output stage. The advantages of a small distance between the sensor arrays as illustrated in connection with FIG. 10 also applies to the parallel arrangements with serial read-out operations.

Figure 12:
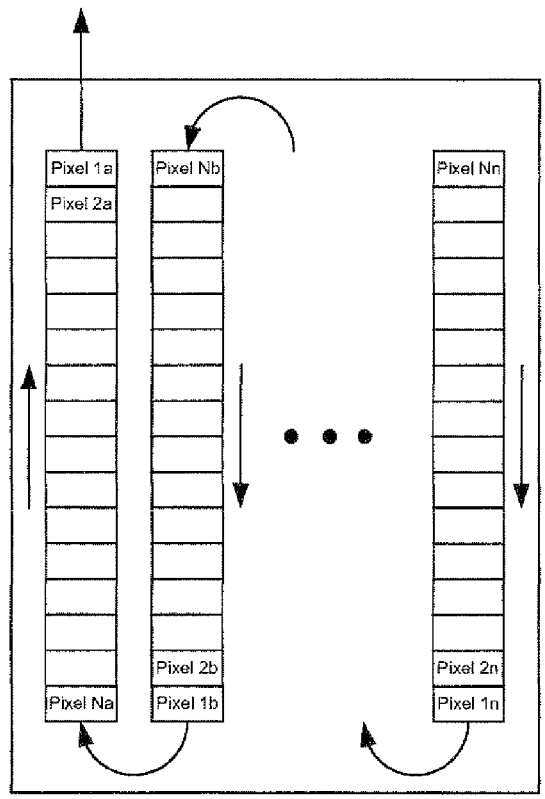
FIG. 12 shows a third exemplary embodiment of a sensor element according to the invention with a parallel arrangement of the sensor arrays.

The sensor element from FIG. 11 can also be extended by supplementing further sensor arrays, with the result that the sensor element illustrated in FIG. 12 arises as a third exemplary embodiment. In this example, n sensor arrays are arranged parallel and connected in series, wherein the read-out directions alternate, that is to say reverse from sensor array to sensor array in terms of their direction relative to the longitudinal axis of the first sensor array. In this example, n is chosen to be even, such that a sequence of linear arrays read in opposite directions in a pairwise manner is realized.

Figure 13:
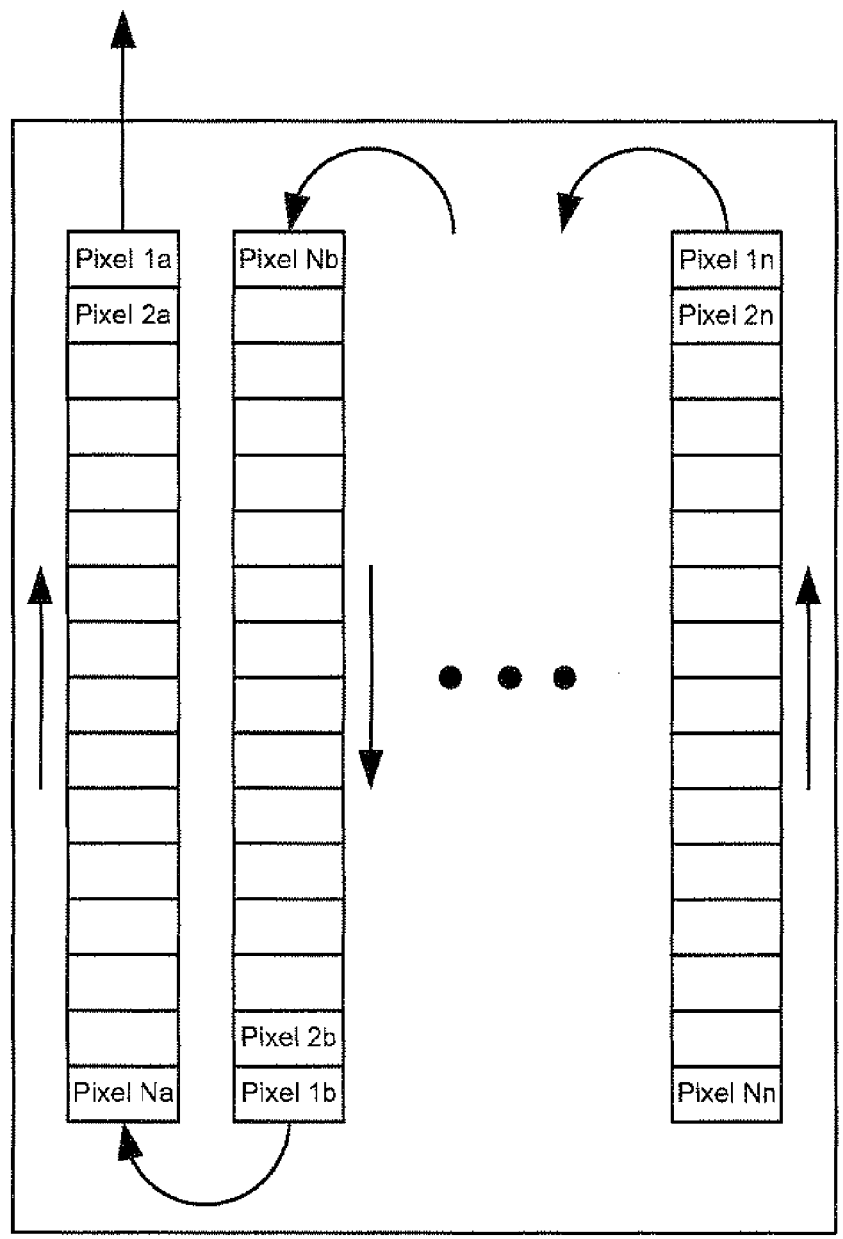
FIG. 13 shows a fourth exemplary embodiment of a sensor element according to the invention with a parallel arrangement of the sensor arrays.

In principle, such an arrangement can also be embodied with an odd number n of sensor arrays, thus resulting in the fourth exemplary embodiment of a sensor element according to the invention as illustrated in FIG. 13. The last array, which is not paired with another sensor array on account of the odd number, can, for example, be provided with a weight function in the evaluation or be averaged together with another sensor array read in the same direction and can then be paired with a further sensor array read in the opposite direction. This therefore results in a sensor pair as 2+1 arrangement with a total of three sensor arrays, of which two are read in the same direction, only taken into account with a weight function and then aggregated with the result of the third sensor array, which is read in the opposite direction, such that a pairing of two sensor arrays combined to form one array with a third sensor array is effected. Such arrangements can be used e.g. for the best possible utilization of code projections poorly illuminated at the edge. Thus, by way of example, in the case of n=3 sensor arrays and an illumination that decreases at the edge of the sensor element, the two outer sensor arrays can be weighted in accordance with the poorer illumination and be compared or aggregated with the sensor array lying in the center of the symmetrical arrangement. Depending on the application, in the case of asymmetrical conditions, however, the two flank arrays can also be weighted differently.

Figure 14:
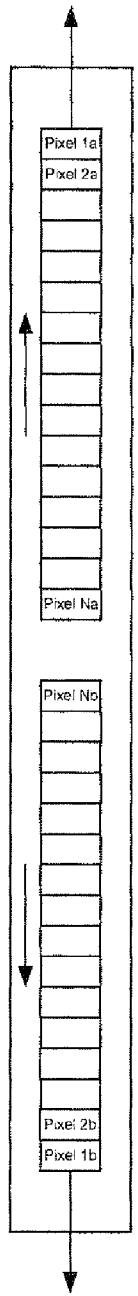
FIG. 14 shows a fifth exemplary embodiment of a sensor element according to the invention with a common longitudinal axis of the sensor arrays.

Besides sensor elements having sensor arrays lying alongside one another and parallel orientation of the longitudinal axes thereof, however, a successive arrangement is also possible, such that the sensor arrays succeed one another in terms of their longitudinal axis and, consequently, all pixels are arranged in a line. One example of such a sensor element is shown in FIG. 14 as a fifth exemplary embodiment of a sensor element according to the invention with a common longitudinal axis of the sensor arrays. In this exemplary embodiment, in a manner analogous to FIG. 10, the two sensor arrays are read separately and therefore have dedicated data lines and signal outputs. Such a linear arrangement can be employed, for example, if a code that is uniform in a longitudinal direction, e.g. a simple incremental code, is displaced in this direction, such that the two sensor arrays detect the same imaging given suitable projection of the code and a distance between the sensor arrays of a multiple of the code period.

Figure 15:
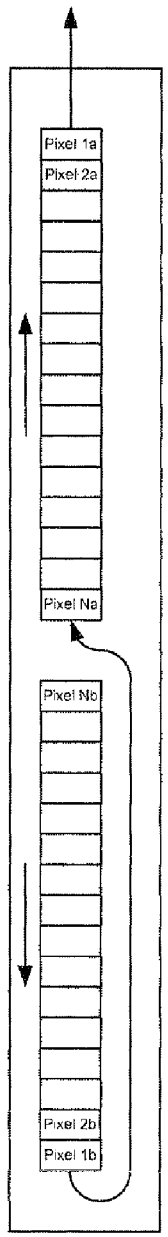
FIG. 15 shows a sixth exemplary embodiment of a sensor element according to the invention with a common longitudinal axis of the sensor arrays.
Figure 16:
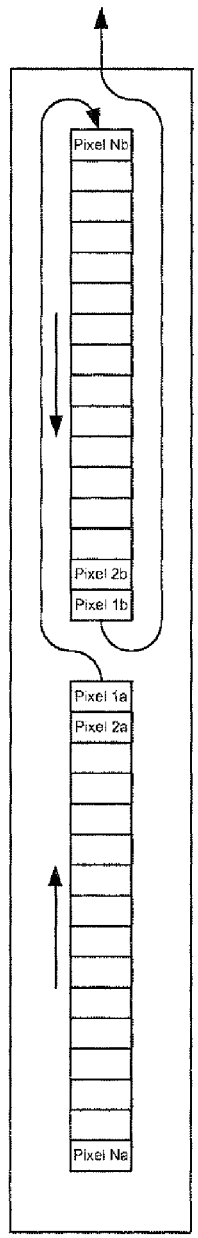
FIG. 16 shows a seventh exemplary embodiment of a sensor element according to the invention with a common longitudinal axis of the sensor arrays.

A series connection with a common read-out operation of the two sensor arrays is shown in FIG. 15 and FIG. 16 with a sixth and seventh exemplary embodiment of a sensor element according to the invention, wherein the read-out directions of the two sensor arrays run or are oriented toward one another in FIG. 15 and run or are oriented away from one another in FIG. 16.

Figure 17:
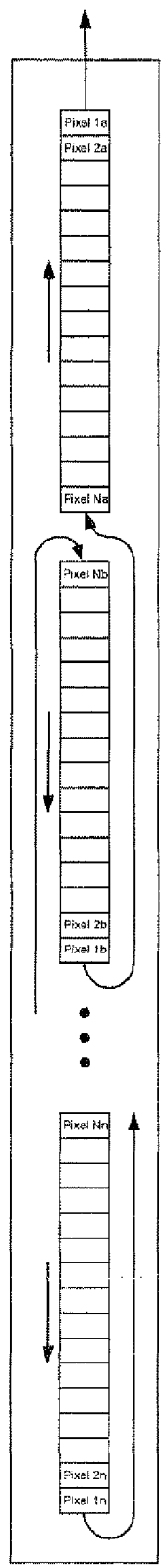
FIG. 17 shows an eighth exemplary embodiment of a sensor element according to the invention with a common longitudinal axis of the sensor arrays.
Figure 18:
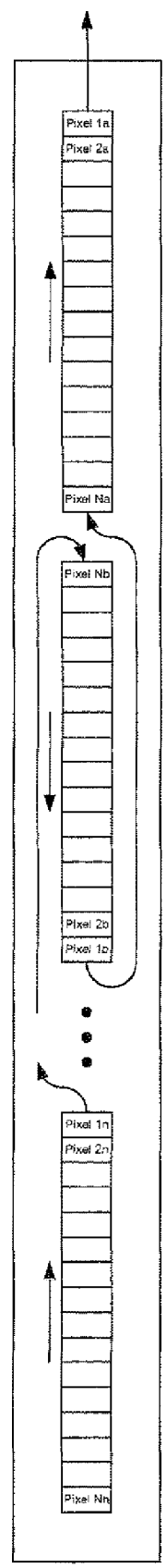
FIG. 18 shows a ninth exemplary embodiment of a sensor element according to the invention with a common longitudinal axis of the sensor arrays.

The arrangement of the sensor arrays which is successive in the longitudinal axis can also be realized with greater numbers of n sensor arrays, where n can once again be even or odd. Examples of this are shown in FIG. 17 and FIG. 18 for an eighth and ninth exemplary embodiment of a sensor element according to the invention.

Figure 19:
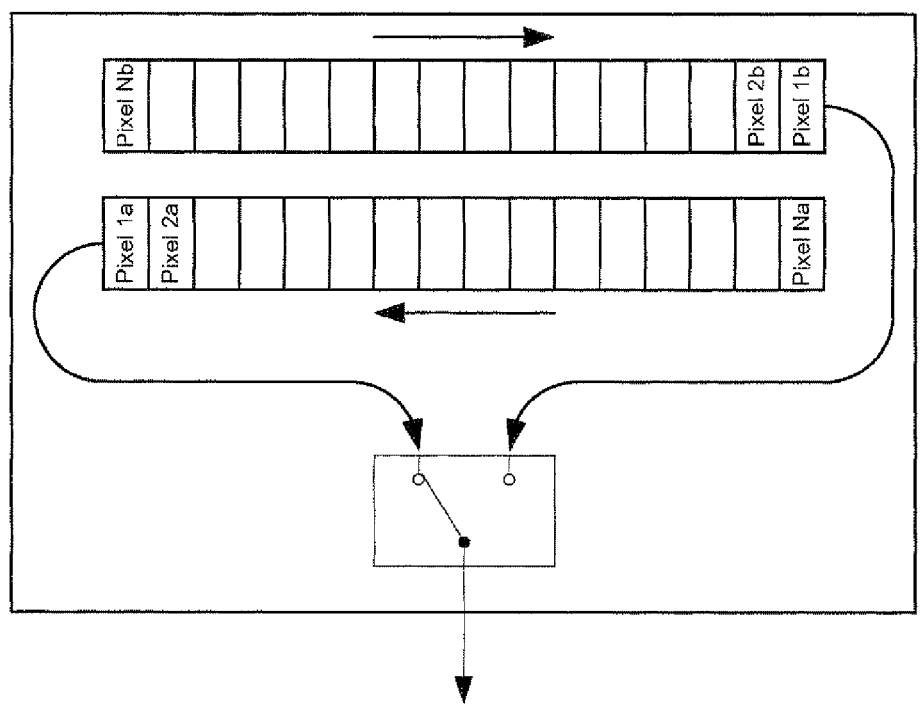
FIG. 19 shows a tenth exemplary embodiment of a sensor element according to the invention with a parallel longitudinal axis of the sensor arrays and a multiplexer and FIG. 20 shows an eleventh exemplary embodiment of a sensor element according to the invention with a common longitudinal axis of the sensor arrays and a multiplexer.
Figure 20:
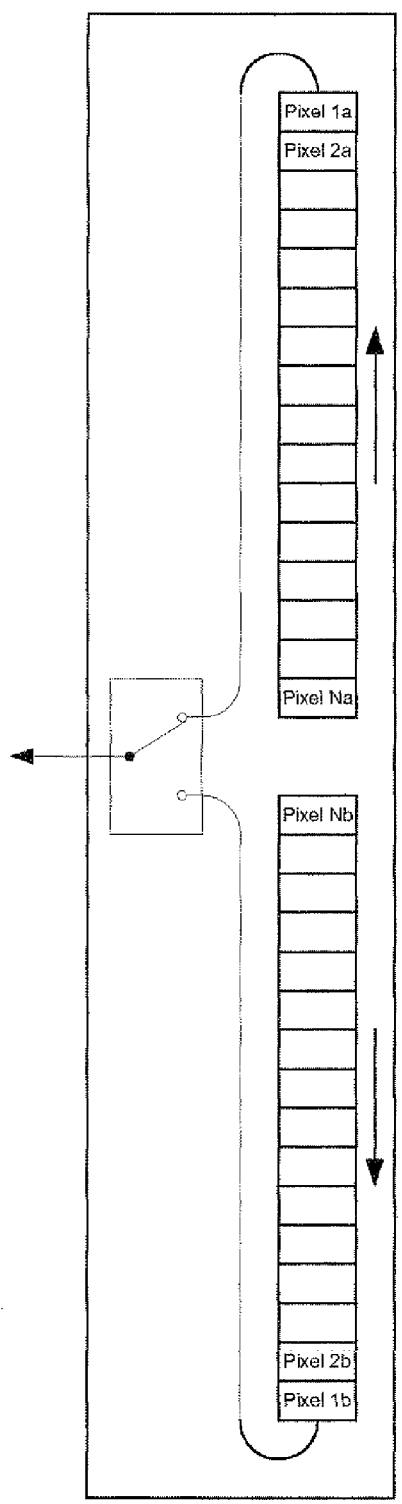

FIG. 19 and FIG. 20 show a tenth and eleventh exemplary embodiment of a sensor element according to the invention with a multiplexer, wherein in FIG. 19 a parallel and in FIG. 20 a common longitudinal axis of the sensor arrays are in turn realized.

In principle, according to the invention it is also possible to realize matrix-like arrangements in which sensor arrays are arranged both alongside one another and successively, which makes it possible, for example, to determine movements or displacements in two axes. For this purpose, it is likewise possible to use area arrays if rows and columns can be read in a corresponding manner.

What is claimed is:

1. A method for determining a position of a code on a movable carrier relative to at least one sensor element having at least one sensor array, comprising:
   moving the carrier in a movement direction relative to the sensor element;
   the at least one sensor array of the sensor element determining the position of code elements imaged in a distinguishable manner by radiation in the region of the sensor array by means of the detected values of the sensor array being read out from the sensor element;

determining the position from the values by averaging; and
either the at least one sensor array reading twice and with opposite read-out directions and/or one sensor pair composed of two sensor arrays each having array-specific read-out directions relative to the movement direction of the carrier reading in a pairwise manner in opposite directions.

2. The method as claimed in claim 1, wherein:
two sensor pairs having sensor arrays read in opposite directions are used;
the code runs on the carrier in the circumferential direction; and
the sensor arrays of a sensor pair which are read in opposite directions are arranged substantially in a manner diametrically opposite one another or angled with respect to one another.

3. The method as claimed in claim 1, wherein the code elements are detected by the at least one sensor array in the form of peaks and at least one threshold value is used for determining a peak position.

4. The method as claimed in claim 3, wherein when deriving position values proceeding from the peak positions of the peaks detected by the at least one sensor array, a correction is carried out dependent on at least one parameter including at least one of a read-out frequency, a threshold value, a radiation intensity, or a temperature.

5. The method as claimed in claim 3, wherein when deriving position values proceeding from the peak positions of the peaks detected by the at least one sensor array, a correction dependent on at least one parameter including at least one of a read-out frequency, a threshold value, a radiation intensity, or a temperature is carried out where a position difference dependent on a parameter is added to the position value derived from the peak positions.

6. The method as claimed in claim 3, wherein in at least one calibration step or at least one control step, at least one sensor pair is read both in opposite directions and in the same direction and a calibration parameter and/or an indication of a disturbance are/is derived from the difference between the two position values determined in the process.

7. The method as claimed in claim 1, wherein the at least one sensor array is read with a frequency of more than 1 MHz.

8. The method as claimed in claim 1, wherein the at least one sensor array is read with a frequency of more than 10 MHz.

9. The method as claimed in claim 1, wherein:
two sensor pairs having sensor arrays read in opposite directions are used;
the code as circular graduation runs on the carrier in the circumferential direction; and
the sensor arrays of a sensor pair which are read in opposite directions are arranged substantially in a manner diametrically opposite one another or angled with respect to one another.

10. A method according to claim 1, wherein the at least one sensor element has at least one CMOS sensor array.

11. A device for determining a position of a code on a movable carrier relative to at least one sensor element having at least one sensor array, comprising:
the at least one sensor element;
the carrier, which is movable in a movement direction relative to the at least one sensor element;
the at least one sensor array which is configured to determine the position of code elements imaged in a distinguishable manner by radiation in the region of the sensor element by means of the detected values being read out from the at least one sensor element, wherein:

the position is determined from the values by averaging;
the at least one sensor array is connected to an evaluation circuit in such a way that the sensor array can be read twice with opposite read-out directions, and/or
one sensor pair is composed of two sensor arrays each having an array-specific read-out direction relative to the movement direction of the carrier is oriented in a pairwise manner and connected to an evaluation device in such a way that the two sensor arrays of a sensor pair can be read with opposite read-out directions relative to the movement direction of the carrier.

12. The device as claimed in claim 11, wherein:
two sensor pairs having sensor arrays read in opposite directions are used;
the code runs on the carrier in the circumferential direction; and
the sensor arrays of a sensor pair which are read in opposite directions are arranged substantially in a manner diametrically opposite one another or angled with respect to one another.

13. The device as claimed in claim 11, wherein:
two sensor pairs having sensor arrays read in opposite directions are used;
the code, as circular graduation, runs on the carrier in the circumferential direction; and
the sensor arrays of a sensor pair which are read in opposite directions are arranged substantially in a manner diametrically opposite one another or angled with respect to one another.

14. The device as claimed in claim 11, wherein a calibration device or a control device is provided, which makes it possible for at least one calibration step or at least one control step to be carried out, wherein at least one sensor pair can be read both in opposite directions and in the same direction and a calibration parameter and/or an indication of a disturbance can be derived from the difference between the two position values determined in the process.

15. The device as claimed in claim 11, wherein the array-specific read-out directions of the sensor arrays of a sensor pair are variable.

16. The device as claimed in any one of claims 11, wherein the array-specific read-out directions of the sensor arrays of a sensor pair are variable and freely switchable.

17. The device as claimed in claim 11, wherein the at least one sensor array can be read with a frequency of more than 1 MHz.

18. The device as claimed in claim 11, wherein the at least one sensor array can be read with a frequency of more than 10 MHz.

19. The device as claimed in claim 11, wherein both sensor arrays of a sensor pair detect the same code elements.

20. A sensor element comprising at least two sensor arrays for carrying out the method as claimed in claim 11, wherein the at least two sensor arrays are connected in series in such a way that they are read with opposite read-out directions and in a common read-out operation as a single sensor array.

21. A sensor element comprising at least two sensor arrays on a common chip for carrying out the method as claimed in claim 11, wherein the at least two sensor arrays are connected in series in such a way that they are read with opposite read-out directions with alternating read-out directions and in a common read-out operation as a single sensor array by successive read-out using a multiplexer.

22. The sensor element as claimed in claim 20, wherein the at least two sensor arrays are oriented with their longitudinal axes parallel to one another or are arranged with their longitudinal axes lying in a common axis.

23. A sensor element comprising at least two sensor arrays for carrying out the method as claimed in claim 11, wherein the at least two sensor arrays each have a signal output and the at least two sensor arrays are oriented with their longitudinal axes parallel to one another, wherein the distance between the sensor arrays is less than three times their width.

24. A sensor element comprising at least two sensor arrays on a common chip for carrying out the method as claimed in claim 11, wherein the at least two sensor arrays each have a signal output and the at least two sensor arrays are oriented with their longitudinal axes parallel to one another, wherein the distance between the sensor arrays is less than three times their width.

\* \* \* \* \*